(12) United States Patent
Jensen

(10) Patent No.: US 7,660,268 B2
(45) Date of Patent: *Feb. 9, 2010

(54) DETERMINING THE PRESENCE OF IP MULTICAST ROUTERS

(75) Inventor: Claus P. Jensen, Copenhagen (DK)

(73) Assignee: Intel Corporation, Santa Clara, CA (US)

( * ) Notice: Subject to any disclaimer, the term of this patent is extended or adjusted under 35 U.S.C. 154(b) by 605 days.

This patent is subject to a terminal disclaimer.

(21) Appl. No.: 11/265,432

(22) Filed: Nov. 1, 2005

(65) Prior Publication Data

US 2006/0062159 A1 Mar. 23, 2006

Related U.S. Application Data

(63) Continuation of application No. 09/753,357, filed on Dec. 29, 2000, now Pat. No. 6,967,932.

(51) Int. Cl.
H04L 12/28 (2006.01)
(52) U.S. Cl. ........................... 370/255; 370/400
(58) Field of Classification Search .......... 370/254, 370/255, 351, 400, 401, 465
See application file for complete search history.

(56) References Cited

U.S. PATENT DOCUMENTS

| 5,546,540 | A | 8/1996 | White | |
|---|---|---|---|---|
| 5,781,726 | A * | 7/1998 | Pereira | 709/200 |
| 5,818,838 | A | 10/1998 | Backes et al. | |
| 6,169,741 | B1 | 1/2001 | LeMaire et al. | |
| 6,370,142 | B1 * | 4/2002 | Pitcher et al. | 370/390 |
| 6,606,321 | B1 * | 8/2003 | Natanson et al. | 370/395.2 |
| 6,654,371 | B1 * | 11/2003 | Dunstan et al. | 370/390 |
| 6,912,223 | B1 * | 6/2005 | Sloane | 370/401 |
| 6,967,932 | B2 * | 11/2005 | Jensen | 370/255 |
| 2002/0062381 | A1 | 5/2002 | Gargiulo et al. | |
| 2002/0120769 | A1 | 8/2002 | Ammitzboell | |
| 2002/0196802 | A1 | 12/2002 | Sakov et al. | |

OTHER PUBLICATIONS

Steve Deering, Aug. 1989, RFC 1112, p. 1-17.
William Fenner, Nov. 1997, The Internet Society, RFC 236, p. 1-24.

* cited by examiner

*Primary Examiner*—Ricky Ngo
*Assistant Examiner*—Christine Ng
(74) *Attorney, Agent, or Firm*—Fish & Richardson P.C.

(57) ABSTRACT

A method for determining the presence of the multicast routers using existing protocols is disclosed. The method includes setting a time interval between a first set of query messages to each of a plurality of routers to a number greater than a querier timeout period used by the routers. The querier timeout period transitions each of the routers into a querier. The presence of each of the routers is revealed by sending a second set of query messages. Membership report messages are then sent to the routers.

10 Claims, 5 Drawing Sheets

DETERMINING THE PRESENCE OF IP MULTICAST ROUTERS

CROSS-REFERENCE TO RELATED APPLICATIONS

The present application is a continuation (and claims the benefit of priority under 35 U.S.C. 120) of U.S. patent application Ser. No. 09/753,357, filed Dec. 29, 2000 now U.S. Pat. No. 6,967,932, entitled "DETERMINING THE PRESENCE OF IP MULTICAST ROUTERS," which is hereby incorporated by reference in its entirety.

BACKGROUND

This invention relates to determining the presence of Internet Protocol (IP) multicast routers, and more particularly to determining the presence of the routers using Internet Group Management Protocol (IGMP) query messages.

Network systems such as the Internet are often configured as point-to-point or unicast systems. In these systems, a message is converted into a series of addressed packets that are routed from a source node through a plurality of routers to a destination node. In many communication protocols, the packet includes a header that contains the addresses of the source and the destination nodes. The header may also contain a sequence number that specifies the packet's order in the message.

In general, these systems do not have the capability to broadcast a message from a source node to all the other nodes in the network because such a capability is rarely of much use and could easily overload the network. However, there are situations where it is desirable for one node to communicate with some subset of all the nodes. For example, multi-party conferencing capability analogous to that found in the public telephone system and broadcasting to a limited number of nodes are of considerable interest to users of packet-switched networks. To satisfy such demands, packets destined for several recipients have been encapsulated in a unicast packet and forwarded from a source to a point in a network where the packets have been replicated and forwarded on to all desired recipients. This technique is known as Internet Protocol (IP) multicast tunneling.

Recently, routers have become available which may route the multicast addresses provided for in communication protocols such as Transmission Control Protocol/Internet Protocol (TCP/IP) using a similar technique referred to as IP multicasting. A multicast address is essentially an address for a group of host computers that have indicated the desire to participate in that group. Thus, a multicast packet may be routed from a source node through a plurality of multicast routers to one or more devices receiving the multicast packets. From there the packet is distributed to all the host computers in the multicast group. Therefore, the IP multicasting conserves bandwidth by forcing the network to do packet replication only when necessary. This offers an attractive alternative to unicast transmission for the delivery of network ticker tapes, live stock quotes, multiparty video-conferencing, and other related applications.

In order to further reduce the data traffic and increase the bandwidth of the network, the source node should avoid routing the multicast packets to ports where there are no receiver nodes or routers. However under current protocols, a means for detecting the presence or absence of the multicast routers is lacking. Thus, the Internet Engineering Task Force (IETF) is currently developing a special protocol that allows determination of the presence of the IP multicast routers.

DESCRIPTION OF DRAWINGS

These and other features and advantages of the invention will become more apparent upon reading the following detailed description and upon reference to the accompanying drawings.

DETAILED DESCRIPTION

In recognition of the above-described difficulties, the present disclosure, in one embodiment, describes a method for determining the presence of the multicast routers using existing protocols. The method uses Internet Group Management Protocol (IGMP) query messages in conjunction with IGMP pruning. This method provides advantages over using the IETF proposed special protocol to detect the presence of the multicast routers. The advantages include not having to reconfigure routers or switch ports for implementation of this method.

The IGMP runs between hosts and their immediately neighboring multicast routers. Thus, the IGMP may be used to identify which multicast group addresses have active receivers. The mechanisms of the protocol allow a host to inform its local router that it wishes to receive transmissions addressed to a specific multicast group. Also, routers periodically query the local area network (LAN) to determine if known group members are still active. If there is more than one router on the LAN performing IP multicasting, one of the routers is elected "querier" and assumes the responsibility of querying the LAN for group members.

Based on the group membership information learned from the IGMP, a router is able to determine which, if any, multicast traffic needs to be forwarded to each of its sub-networks. Multicast routers use this information, in conjunction with a multicast routing protocol, to support IP multicasting across the Internet.

Figure 1:
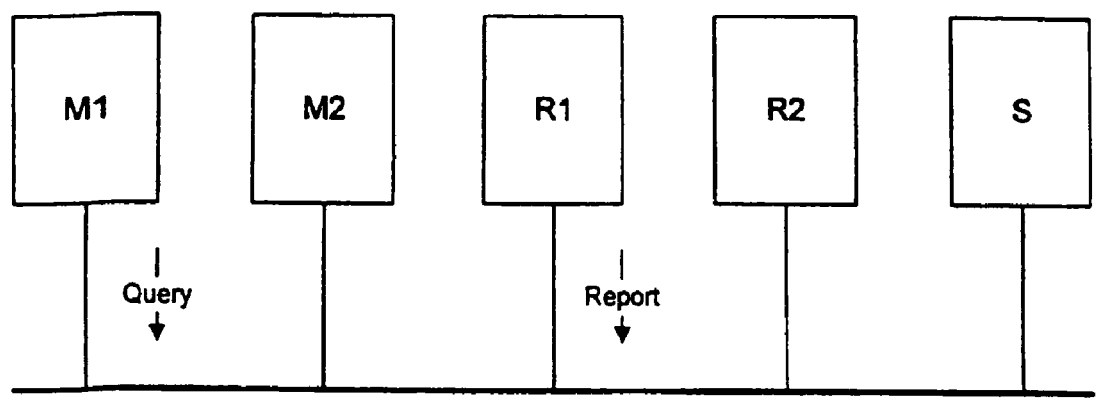
FIG. 1 shows an example of an IGMP protocol operation.

According to the IGMP specification, multicast routers, which have been elected as "queriers," periodically transmit query messages as shown in FIG. 1. The messages are transmitted to determine which host groups have members on their directly attached networks. Therefore, if all multicast routers can be elected to serve as queriers during a determination period, the presence or absence of multicast routers may be determined when the query messages are received.

In the illustrated embodiment, a multicast router (M1 or M2) may be elected as a querier if no report messages have been received for a pre-defined querier interval. In one case, the default interval is set at about 255 seconds. Thus, the multicast router, in this case, assumes that no receivers are present. The multicast router, which is elected to be the querier, then sends query messages at every query interval. The default query interval may be set at 125 seconds.

When a host receives the query message, it responds with a report message for each host group to which it belongs. In order to avoid a flurry of report messages, each host starts a randomly chosen report delay timer for each of its group membership. If during the delay period, another report is heard for the same group, the local host resets its timer to a new random value. Otherwise, the host transmits a report message to the reported group address, causing all other members of the group to reset their report message timer. This procedure guarantees that report messages are spread out over a period of time and that report traffic is minimized for each group.

In the illustrated embodiment of FIG. 1, M1 and M2 are multicast routers. M1 has the lowest IP address and has been elected as a querier. R1 and R2 are receiver hosts. Therefore, upon reception of a general query message, the hosts set a random timer and the host with the smallest time will respond. Host S sends data to the multicast address but does not participate in the IGMP protocol.

Figure 2:
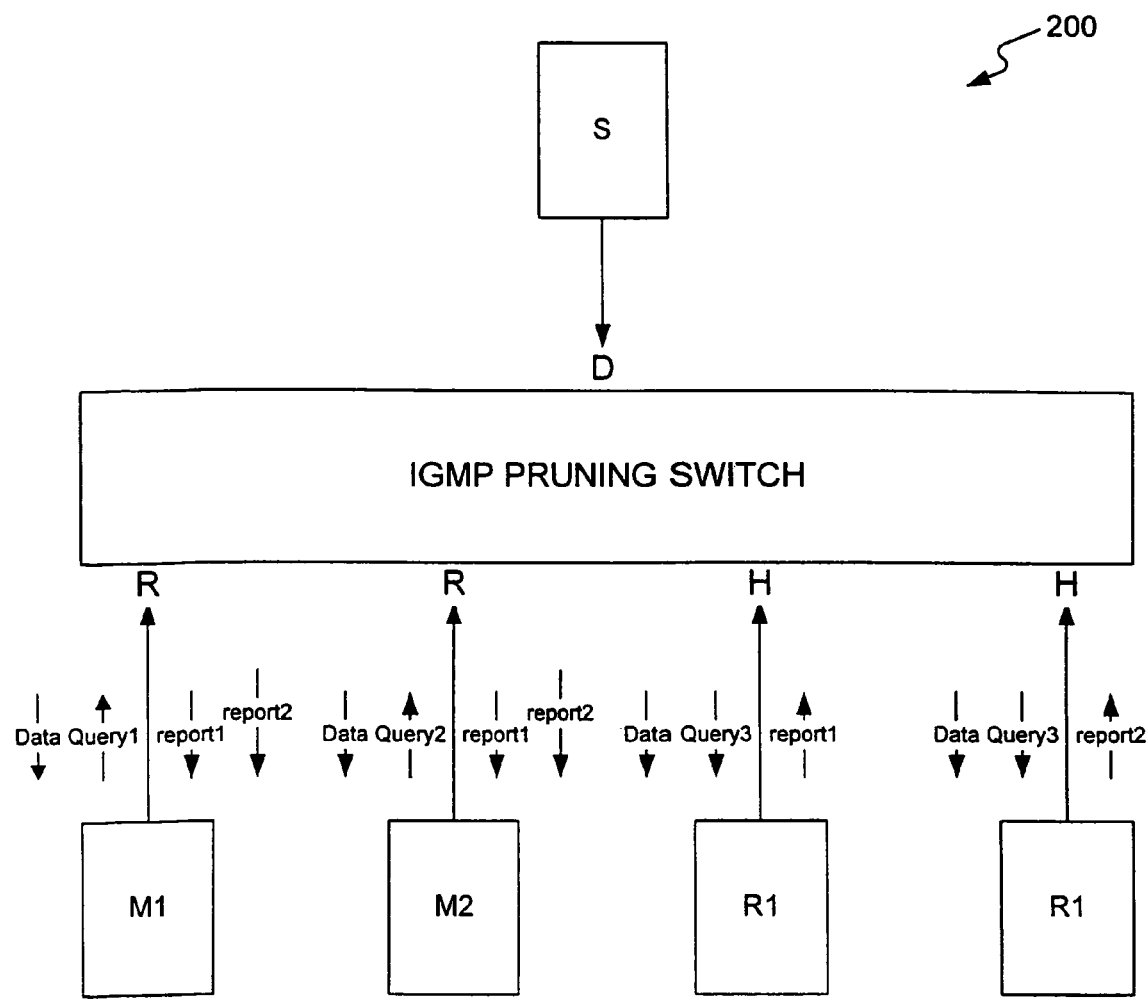
FIG. 2 illustrates an IGMP pruning switch system according to one embodiment of the present disclosure.

FIG. 2 illustrates an IGMP pruning switch system 200 according to one embodiment of the present disclosure. The system 200 is adapted to determine the multicast routers present on the switch port using query messages transmitted by the routers. Thus, the objective is to avoid sending multicast data to ports on which there are no receivers or routers.

In the illustrated embodiment, the system 200 includes at least three states in which the IP multicast traffic is managed. The states are Discovery (D), Host (H), and Router (R). According to FIG. 2, the switch port connected to the sender is in Discovery state. Ports connected to multicast routers M1 and M2 are in Router state. Ports connected to receiver hosts R1 and R2 are in Host state.

In the Discovery state, each port determines whether the port is a host or router port. During the Discovery state, a pre-defined interval between a set of query messages is set to a number greater than the querier interval. For example, the interval of 300 seconds may be selected. Thus, by holding back query messages for longer period than the timeout used by the routers, the correct state may be determined. The switch generates Query3 and sends it to the host ports.

Once the determination is made, the membership report messages are only sent to ports in Router state. This forces all hosts to send membership report messages in Host state. Membership query messages are generated by the switch and sent only to host ports. This forces all routers to assume querier state, and send membership queries.

Figure 3:
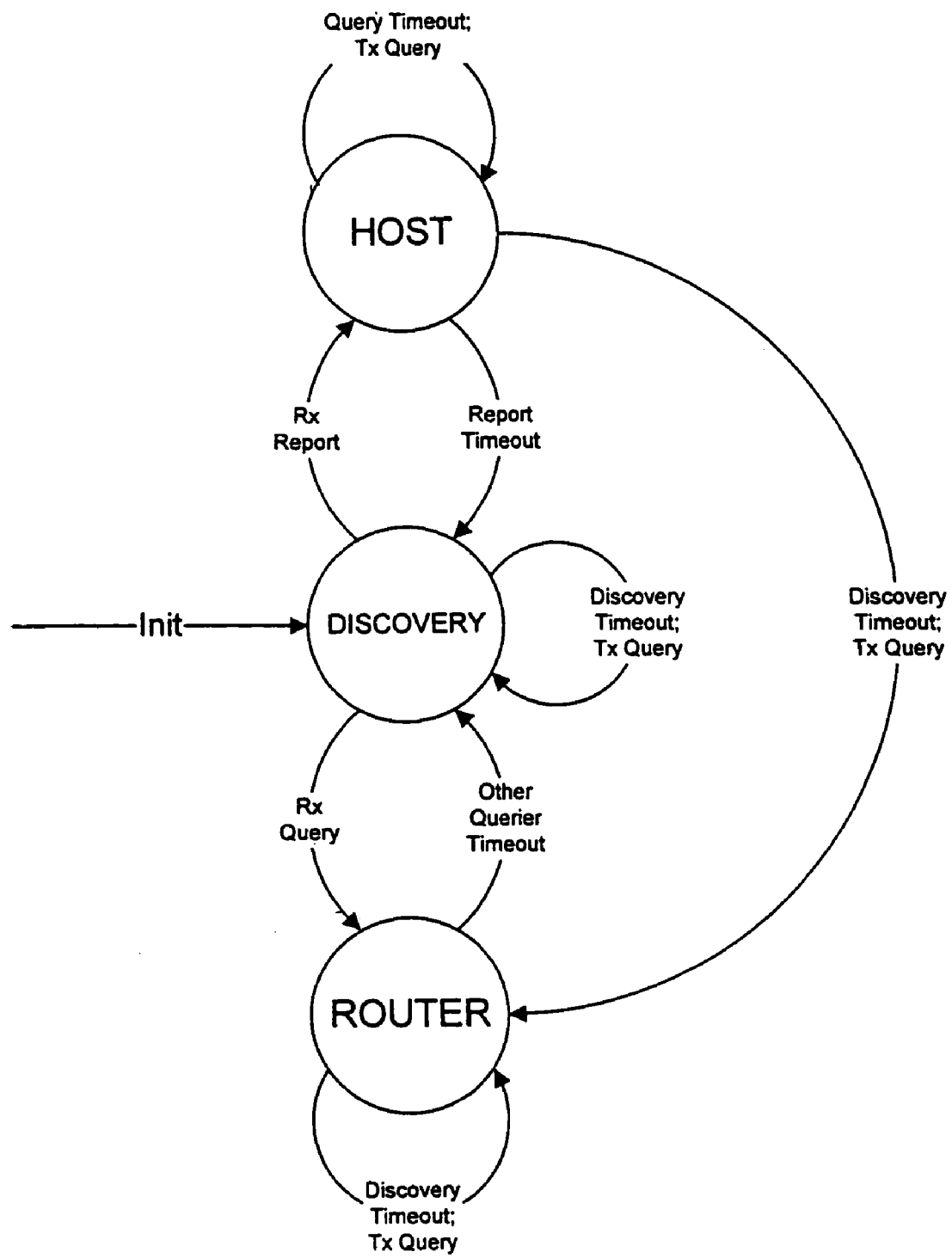
FIG. 3 shows a state diagram for switch ports in accordance with an embodiment.

A state diagram for switch ports is shown in FIG. 3. Initially, the port is in Discovery state. Received packets or various timeout events cause state changes. Note that the port will end in Router state if both Queries and Report/Leave messages are received. Note also that two connected switches running this state machine will go to Router state on the connecting ports.

Figure 4:
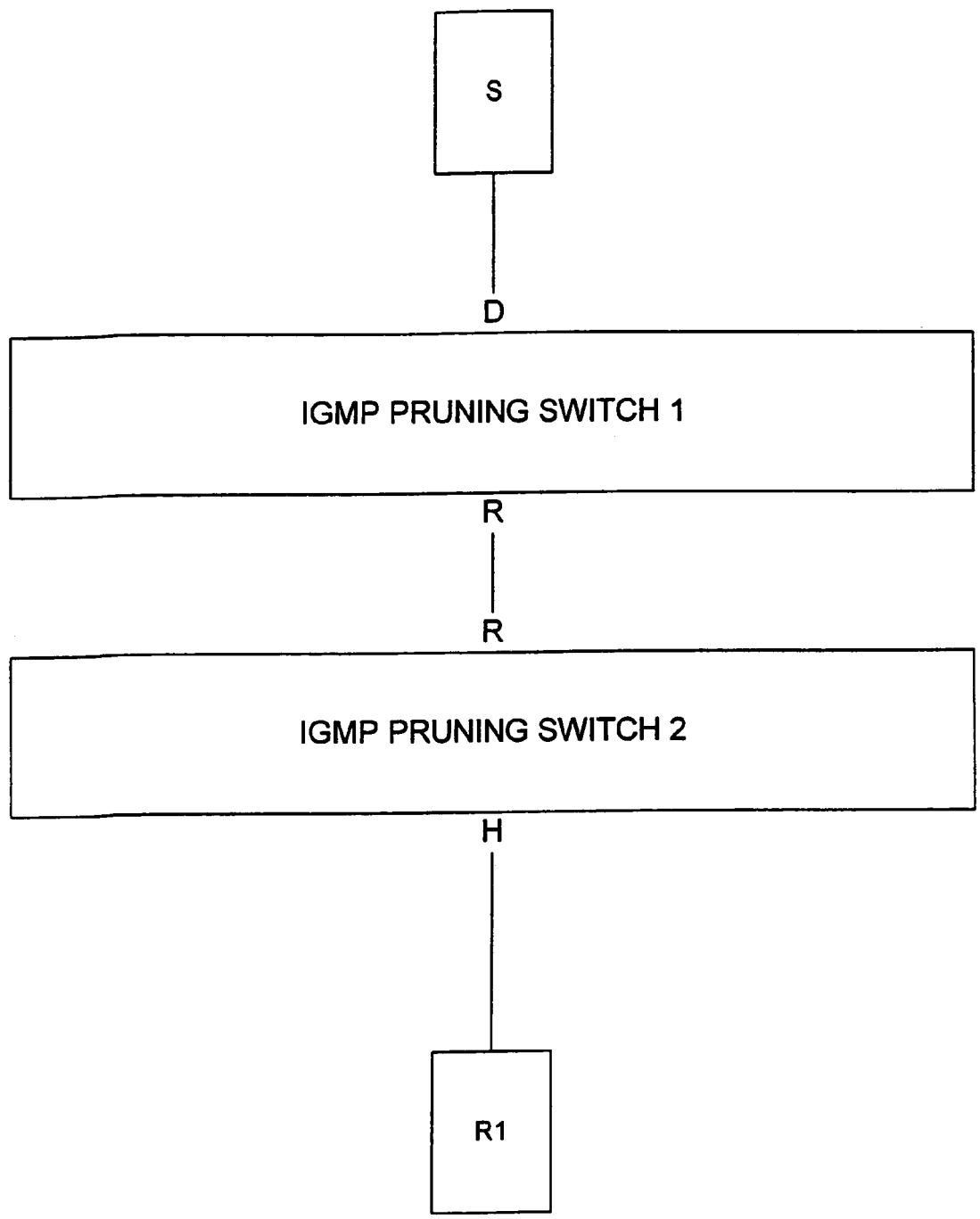
FIG. 4 shows another embodiment of an IGMP switch system having two connected switches.

An example with two connected switches is shown in FIG. 4. The ports connecting the switches are in the Router state. This ensures that reports and data traffic are forwarded on the link between the switches.

Figure 5:
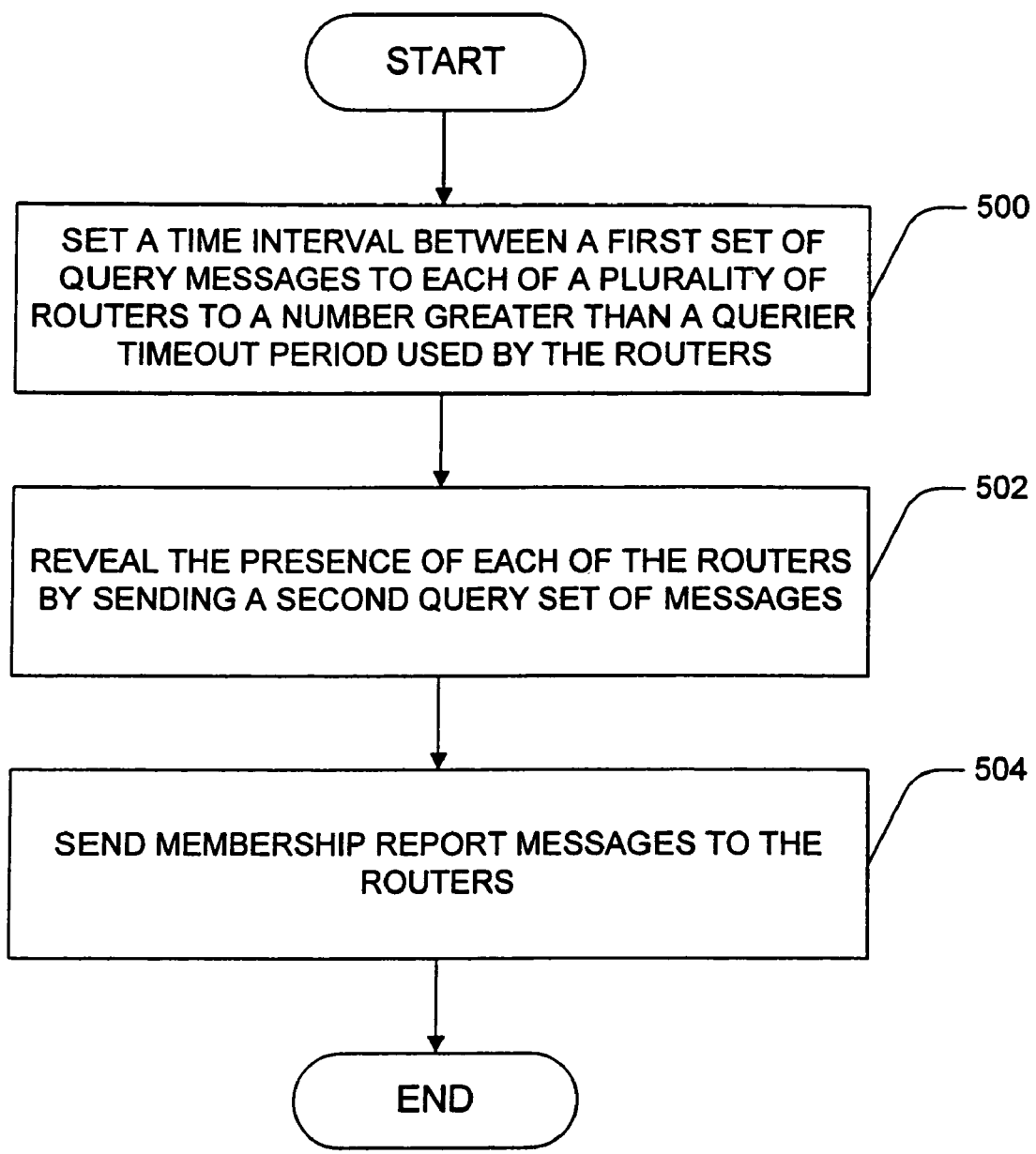
FIG. 5 is a flowchart of a method for determining the presence of the multicast routers using existing protocols.

FIG. 5 is a flowchart of a method for determining the presence of the multicast routers using existing protocols. The method includes setting a time interval between a first set of query messages to each of a plurality of routers to a number greater than a querier timeout period used by the routers at 500. The querier timeout period transitions each of the routers into a querier. Each of the routers reveals its presence by sending a second set of query messages at 502. At 504, the membership report messages are sent to the routers.

While specific embodiments of the invention have been illustrated and described, other embodiments and variations are possible. For example, although the illustrated embodiments show only two connected IGMP switches, any number of switches may be connected in the Router state.

All these are intended to be encompassed by the following claims.

What is claimed is:

1. An apparatus comprising:
   multiple ports configured to connect with links to network nodes; and
   state control information associated with the multiple ports and specifying for a port at least one of three states comprising a discovery state, a host state, and a router state;
   wherein the discovery state delays sending of a query message through the port for a time interval that is greater than a querier timeout period used by one or more routers of the network nodes;
   wherein the port's state control information changes from the discovery state to the host state in response to receipt of a membership report message, and changes from the discovery state to the router state in response to receipt of a query message.

2. The apparatus of claim 1, wherein the port's state control information changes from the host state to the router state after a discovery timeout period.

3. An apparatus comprising:
   multiple ports configured to connect with links to network nodes; and
   state control information associated with the multiple ports and specifying for a port at least one of three states comprising a discovery state, a host state, and a router state;
   wherein the discovery state delays sending of a query message through the port for a time interval that is greater than a querier timeout period used by one or more routers of the network nodes;
   wherein the port's state control information ends in the router state if both query and report messages are received via the port.

4. An apparatus comprising:
   multiple ports configured to connect with links to network nodes; and
   state control information associated with the multiple ports and specifying for a port at least one of three states comprising a discovery state, a host state, and a router state;
   wherein the discovery state delays sending of a query message through the port for a time interval that is greater than a querier timeout period used by one or more routers of the network nodes;
   wherein the multiple ports comprise switch ports of an Internet Group Management Protocol (IGMP) switch;
   wherein the IGMP switch is configured to send membership report messages to one or more multicast routers revealed by the delayed sending of the query message in the discovery state.

5. The apparatus of claim 4, wherein the membership report messages include a report from each of multiple host groups.

6. A system comprising:
   one or more Internet Protocol (IP) routers configured to generate query messages and route data in an IP network;
   hosts configured to generate report messages and communicate over the IP network; and
   an Internet Group Management Protocol (IGMP) switch including switch ports configured to connect with the one or more IP routers and the hosts, wherein the IGMP switch uses IGMP query messages in conjunction with IGMP pruning to determine presence of the one or more IP routers;

wherein the IGMP switch includes associated state control information for the switch ports, the state control information specifying for a port at least one of three states comprising a discovery state, a host state, and a router state; wherein the discovery state delays sending of a query message through the port for a time interval that is greater than a querier timeout period used by the one or more IP routers;

wherein the port's state control information changes from the discovery state to the host state in response to receipt of a membership report message, and changes from the discovery state to the router state in response to receipt of a query message.

7. A system comprising:

one or more Internet Protocol (IP) routers configured to generate query messages and route data in an IP network;

hosts configured to generate report messages and communicate over the IP network; and an Internet Group Management Protocol (IGMP) switch including switch ports configured to connect with the one or more IP routers and the hosts, wherein the IGMP switch uses IGMP query messages in conjunction with IGMP pruning to determine presence of the one or more IP routers;

wherein the IGMP switch includes associated state control information for the switch ports, the state control information specifying for a port at least one of three states comprising a discovery state, a host state, and a router state; wherein the discovery state delays sending of a query message though the port for a time interval that is greater than a querier timeout period used by the one or more IP routers;

wherein the port's state control information changes from the host state to the router state after a discovery timeout period.

8. A system comprising:

one or more Internet Protocol (IP) routers configured to generate query messages and route data in an IP network;

hosts configured to generate report messages and communicate over the IP network; and an Internet Group Management Protocol (IGMP) switch including switch ports configured to connect with the one or more IP routers and the hosts, wherein the IGMP switch uses IGMP query messages in conjunction with IGMP pruning to determine presence of the one or more IP routers;

wherein the IGMP switch includes associated state control information for the switch ports, the state control information specifying for a port at least one of thee states comprising a discovery state, a host state, and a router state; wherein the discovery state delays sending of a query message through the port for a time interval that is greater than a querier timeout period used by the one or more IP routers;

wherein the port's state control information ends in the router state if both query and report messages are received via the port.

9. A system comprising:

one or more Internet Protocol (IP) routers configured to generate query messages and route data in an IP network;

hosts configured to generate report messages and communicate over the IP network; and an Internet Group Management Protocol (IGMP) switch including switch ports configured to connect with the one or more IP routers and the hosts, wherein the IGMP switch uses IGMP query messages in conjunction with IGMP pruning to determine presence of the one or more IP routers;

wherein the IGMP switch includes associated state control information for the switch ports, the state control information specifying for a port at least one of three states comprising a discovery state, a host state, and a router state; wherein the discovery state delays sending of a query message through the port for a time interval that is greater than a querier timeout period used by the one or more IP routers;

wherein the IGMP switch is configured to send membership report messages to one or more multicast routers revealed by the delayed sending of the query message in the discovery state.

10. The system of claim 9, wherein the membership report messages include a report from each of multiple host groups.

* * * * *